United States Patent
Ihm et al.

(10) Patent No.: US 9,467,990 B2
(45) Date of Patent: Oct. 11, 2016

(54) METHOD AND APPARATUS FOR DETECTING CONTROL CHANNEL IN WIRELESS COMMUNICATION SYSTEM

(71) Applicant: LG ELECTRONICS INC., Seoul (KR)

(72) Inventors: Bin Chul Ihm, Anyang-si (KR); Ki Tae Kim, Anyang-si (KR); Su Nam Kim, Anyang-si (KR); Ji Won Kang, Anyang-si (KR); Jin Young Chun, Anyang-si (KR); Sung Ho Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 63 days.

(21) Appl. No.: 14/358,000

(22) PCT Filed: Nov. 16, 2012

(86) PCT No.: PCT/KR2012/009754
§ 371 (c)(1),
(2) Date: May 13, 2014

(87) PCT Pub. No.: WO2013/073899
PCT Pub. Date: May 23, 2013

(65) Prior Publication Data
US 2014/0286299 A1 Sep. 25, 2014

Related U.S. Application Data

(60) Provisional application No. 61/560,298, filed on Nov. 16, 2011.

(51) Int. Cl.
*H04W 72/04* (2009.01)
*H04L 5/00* (2006.01)
*H04B 7/02* (2006.01)

(52) U.S. Cl.
CPC .......... *H04W 72/042* (2013.01); *H04L 5/0007* (2013.01); *H04L 5/0053* (2013.01); *H04B 7/022* (2013.01)

(58) Field of Classification Search
CPC .............. H04W 72/042; H04L 5/0053; H04L 5/0007; H04B 7/022
USPC ........................................... 370/329; 375/340
See application file for complete search history.

(56) References Cited

U.S. PATENT DOCUMENTS

| | | | |
|---|---|---|---|
| 2013/0039284 A1* | 2/2013 | Marinier | H04L 5/001 370/329 |
| 2013/0039291 A1* | 2/2013 | Blankenship | H04L 5/001 370/329 |

(Continued)

FOREIGN PATENT DOCUMENTS

| | | |
|---|---|---|
| KR | 1020100116550 | 11/2010 |
| KR | 1020110020719 | 3/2011 |

(Continued)

OTHER PUBLICATIONS

PCT International Application No. PCT/KR2012/009754, International Search Report, dated Mar. 19, 2013, 1 page.

*Primary Examiner* — Kwang B Yao
*Assistant Examiner* — Syed M Bokhari
(74) *Attorney, Agent, or Firm* — Lee, Hong, Degerman, Kang & Walmey; Jonathan Kang; Michael Monaco

(57) ABSTRACT

Provided are a method for searching for a control channel by a terminal in a wireless communication system and a terminal for using the method. The method determines whether an allocation unit constituting an enhanced-physical downlink control channel (E-PDCCH) is one or plural in number; and, if the allocation unit constituting the E-PDCCH is plural in number, searches for the E-PDCCH using a user equipment specific reference signal (URS) of an antenna port defined in one allocation unit from among the plurality of allocation units.

8 Claims, 13 Drawing Sheets

(56) References Cited

U.S. PATENT DOCUMENTS

2013/0064196 A1* 3/2013 Gao .................. H04L 5/0016
                                                370/329
2014/0226761 A1* 8/2014 Nory ................. H04L 25/0228
                                                375/340

FOREIGN PATENT DOCUMENTS

KR    1020110084976    7/2011
KR    1020110086246    7/2011

* cited by examiner

METHOD AND APPARATUS FOR DETECTING CONTROL CHANNEL IN WIRELESS COMMUNICATION SYSTEM

CROSS-REFERENCE TO RELATED APPLICATIONS

This application is the National Stage filing under 35 U.S.C. 371 of International Application No. PCT/KR2012/009754, filed on Nov. 16, 2012, which claims the benefit of U.S. Provisional Application No. 61/560,298, filed on Nov. 16, 2011, the contents of which are hereby incorporated by reference herein in their entirety.

BACKGROUND OF THE INVENTION

1. Field of the Invention

The present invention relates to wireless communication, and more particularly, to a method and device for detecting a control channel in a wireless communication system.

2. Related Art

Recently, the amount of transmission of data of a wireless communication network is on a rapid increase. This is because various devices such as a smart phone and a tablet PC which require machine-to-machine (M2M) communication and a large amount of data transmission appear and are distributed. In order to satisfy the high amount of transmission of data, a carrier aggregation technology which efficiently uses more frequency bands, a cognitive radio technology, etc., are drawing attention, and in order to increase the data capacity within limited frequencies, a multi-antenna technology, a multi base station cooperation technology, etc. are drawing attention.

Furthermore, the wireless communication network is evolving in a direction that the density of nodes, which may have an access to the area around the user, increases. Here, a node may refer to an antenna or antenna group which is placed away by more than a certain interval from a distributed antenna system (DAS), but the meaning of the node may be extended. That is, the node may be a base station (PeNB), a home base station (HeNB), a remote radio head (RRH), a remote radio unit (RRU), a relay, etc. The wireless communication system may show a higher system performance by cooperation between nodes. That is, if each node operates like an antenna or antenna group for one cell by transmission and reception management by one control station, a much superior system performance may be shown. Hereinafter, a wireless communication including a plurality of nodes is called a multi-node system.

A node may be applied even if defined not only as an antenna group which is placed away by more than a certain interval, but also as an arbitrary antenna group regardless of an interval. For example, the base station composed of a doss polarized antenna may be formed of a node composed of a H-pol antenna and a node composed of a V-pol antenna.

Furthermore, in a multi-node system, a new control channel may be used due to inter-cell interference an insufficient capacity in the existing control channel, etc. In the existing control channel, decoding was possible based on a cell-specific reference signal (CRS) which may be received by all user equipments (UEs), but in a new control channel, decoding may be possible based on a user equipment-specific reference signal (URS).

The new control channel may be allocated to the data region among the control region and the data region in the subframe. In this case, the new control channel may be allocated to a wireless resource region to which two different resource allocation schemes including non-interleaving and interleaving are applied. At this time, the scheme, in which the URS, which may be used in decoding a new control channel in another wireless resource region, is provided, is an issue. From the perspective of the UE, the way, in which a new control channel is to be searched and decoded using which URS, is an issue.

SUMMARY OF THE INVENTION

An object of the present invention is to provide a method and apparatus for providing a reference signal used in detecting and decoding a new control channel different from an existing control channel in a wireless communication system, and detecting and decoding the new control channel by using the reference signal.

In accordance with an aspect of the present invention, a method for detecting a control channel of a user equipment (UE) in a wireless communication system includes: determining whether an allocation unit constituting an enhanced-physical downlink control channel (E-PDCCH) is one or plural in number; and if the allocation unit constituting the E-PDCCH is plural in number, searching for the E-PDCCH using a UE specific reference signal (URS) of an antenna port defined in one allocation unit form the plurality of allocation units.

In accordance with another aspect of the present invention, user equipment (UE) for detecting a control channel in a wireless communication system includes: a radio frequency (RF) unit to transmit and receive a wireless signal; and a processor connected to the RF unit, wherein the processor determines whether an allocation unit constituting an enhanced-physical downlink control channel (E-PDCCH) is one or plural in number; and searches for the E-PDCCH using a UE specific reference signal (URS) of an antenna port defined in one allocation unit form the plurality of allocation units if the allocation unit constituting the E-PDCCH is plural in number.

When an antenna port of an URS is defined by allocation units to which the E-PDCCH is allocated and an aggregation level is 2 or greater, the UE attempts to detect the E-PDCCH using an URS with respect to one antenna port designated through signaling or previously designated. Accordingly, the number of times of blind decoding of the UE can be reduced.

DESCRIPTION OF EXEMPLARY EMBODIMENTS

A user equipment (UE) may be fixed or mobile, and may also be called a mobile station (MS), a mobile terminal (MT), a user terminal (UT), a subscriber station (SS), a wireless device, a personal digital assistant (PDA), a wireless modem, a handheld device, etc.

A base station generally refers to a fixed station which communicates with a UE, and may also be called an evolved-NodeB (eNB), a base transceiver system (BTS), an access point, etc.

Hereinafter, the application of the present invention based on the 3GPP LTE based on $3^{rd}$ generation partnership project (3GPP) technical specification (TS) release 8 and 3GPP LTE-A based on 3GPP TS release 10 will be described. However, these are merely examples, and the present invention may be applied to various wireless communication networks.

In order to improve the performance of the wireless communication system, the technology is evolving in a direction that increases the density of the node which may be connected to the area around the user. The performance of the wireless communication system with a high node density may be improved by cooperation between nodes.

Figure 1:
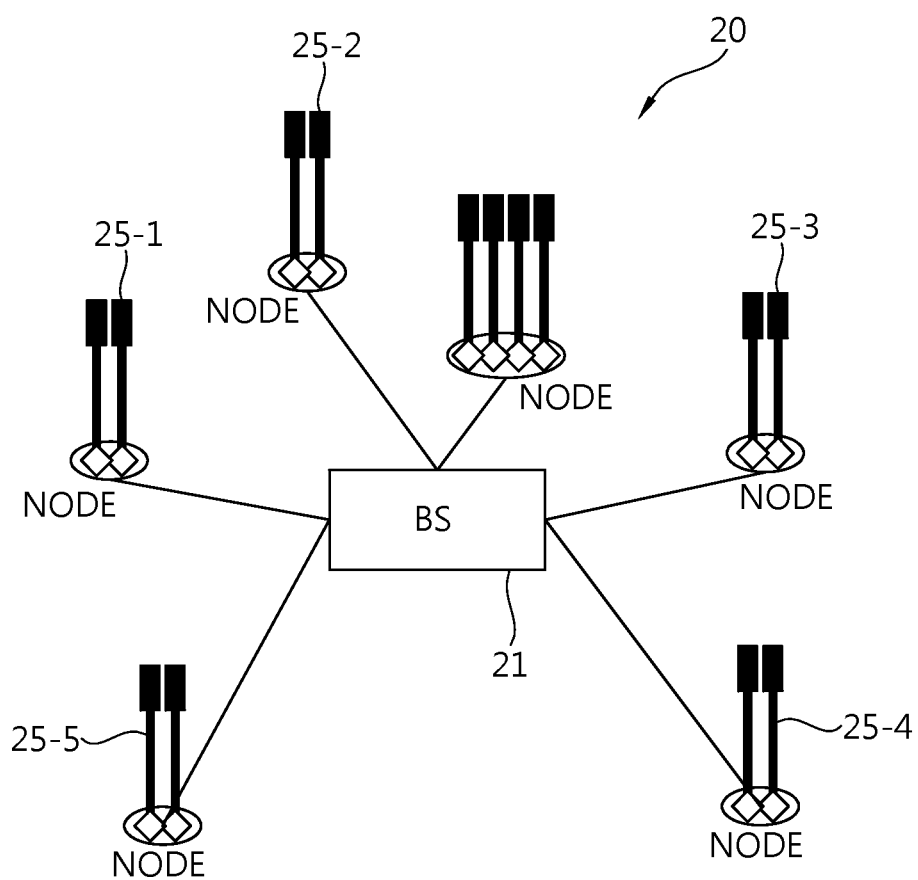
FIG. 1 shows an example of a multi-node system.

FIG. 1 shows an example of a multi-node system.

Referring to FIG. 1, the multi-node system 20 may include one base station 21 and a plurality of nodes 25-1, 25-2, 25-3, 25-4, and 25-5. The plurality of nodes 25-1, 25-2, 25-3, 25-4, and 25-5 may be managed by one base station 21. That is, the plurality of nodes 25-1, 25-2, 25-3, 25-4, and 25-5 may operate as if they were a part of one cell. At this time, each node 25-1, 25-2, 25-3, 25-4, or 25-5 may be allocated a separate node ID or may operate like some antenna groups within the cell without a separate node ID. In such a case, the multi-node system 20 of FIG. 1 may be considered as a distributed multi-node system (DMNS) which forms one cell.

Furthermore, a plurality of nodes 25-1, 25-2, 25-3, 25-4, and 25-5 may perform scheduling and handover (HO) of the UE without individual cell IDs. In such a case, the multi-node system 20 of FIG. 1 may be considered as a multi-cell system. The base station 21 may be a macro cell, and each node may be a femto cell or a pico cell having a cell coverage smaller than a cell coverage of the macro cell. Likewise, when the plurality of cells are overlaid according to the coverage, the network may be called a multi-tier network.

In FIG. 1, each node 25-1, 25-2, 25-3, 25-4, or 25-5 may be one of a base station, a Node-B, an eNode-B, a pico cell eNb (PeNB)), a home eNB (HeNB), a radio remote head (RRH), a relay station (RS) or repeater, and a distributed antenna. At least one antenna may be installed at one node. Furthermore, the node may be called a point. In the specification below, the node refers to an antenna group which is placed away by more than a certain interval from the DMNS. That is, it is assumed below that each node physically refers to RRH. However, the present invention is not limited to this example, and the node may be defined as an arbitrary antenna group regardless of the physical interval. For example, the base station, which is composed of a plurality of cross polarized antennas, may be formed of a node composed of horizontal polarized antennas and a node composed of vertical polarized antennas. The present invent may also be applied to the case when the cell coverage of each node is a small pico cell or a femto cell, i.e., the multi-cell system. In the description below, the antenna may be substituted by an antenna port, a virtual antenna, an antenna group, etc. as well as a physical antenna.

Figure 2:
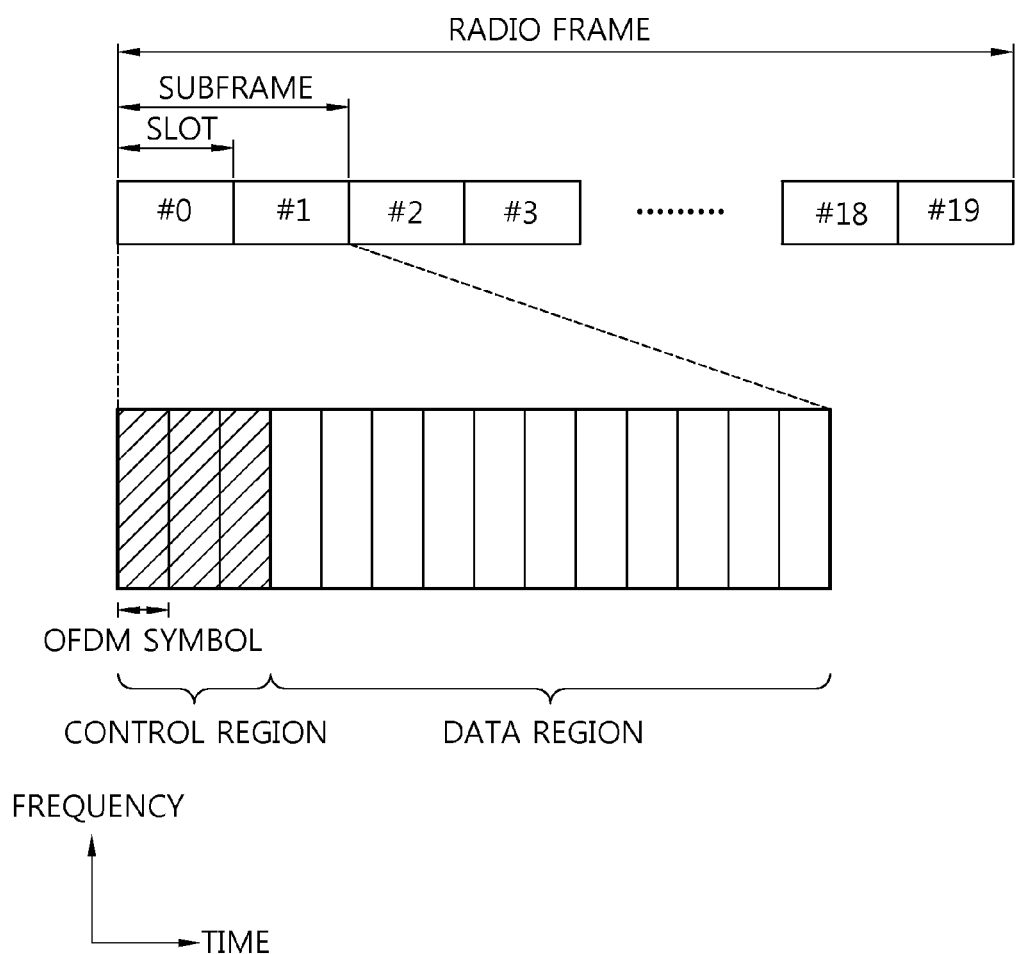
FIG. 2 shows a structure of a downlink wireless frame in a 3GPP LTE-A.

FIG. 2 shows a structure of a downlink wireless frame in a 3GPP LTE-A. For this, section 6 of 3GPP TS 36.211 V10.2.0 (2011-06) "Evolved Universal Terrestrial Radio Access (E-UTRA); Physical Channels and Modulation (Release 10)" may be referred to.

A radio frame includes 10 subframes having indexes 0 to 9. One subframe includes two consecutive slots. The time, which takes in transmission of one subframe, is called a transmission time interval (TTI). For example, the length of one subframe may be 1 ms, and the length of one slot may be 0.5 ms.

One slot may include a plurality of orthogonal frequency division multiplexing (OFDM) symbols. The OFDM symbol uses an orthogonal frequency division multiple access (OFDMA) in DL, and thus it is only to express one symbol period in the time domain and there is no limitation in the multiplexing scheme or name. For example, the OFDM symbol may be called as another name such as a single carrier-frequency division multiple access (SC-FDMA) or a symbol period.

It is illustrated that one slot includes 7 OFDM symbols, but the number of OFDM symbols included on slot may be changed depending on the length of the cyclic prefix (CP). According to 3GPP TS 36.211 V10.2.0, 1 slot in the normal CP includes 7 OFDM symbols, 1 slot in the extended CP includes 6 OFDM symbols.

The resource block (RB) is a resource allocation unit, and includes a plurality of subcarriers in one slot. For example, if one slot 7 OFDM symbols in the time domain and the RB includes 12 subcarriers in the frequency domain, one RB may include 7×12 resource elements (REs).

The DL subframe is divided into a control region and a data region in the time domain. The control region includes the maximum 4 OFDM symbols before the first slot within the subframe, but the number of OFDM symbols included in the control domain may be changed. The physical downlink control channel (PDCCH) and other control channels are allocated to the control region, and the DPSCH is allocated to the data region.

As disclosed in 3GPP TS 36.211 V10.2.0, in 3GPP LTE/LTE-A, the physical channel may be divided into physical downlink shared channel (PDSCH) and physical uplink shared channel (PUSCH) which are data channels, and physical downlink control channel (PDCCH), physical control format indicator channel (PCFICH), physical hybrid-ARQ indicator channel (PHICH), and physical uplink control channel (PUCCH) which are control channels.

The PCFICH, which is transmitted in the first OFDM symbol of the subframe, carries the control format indicator (CFI) about the number of OFDM symbols (i.e., the size of the control region) used in the transmission of control channels within the subframe. The UE first receives CFI on the PCFICH and monitors PDCCH.

Unlike PDCCH, the PCFICH is transmitted through the fixed PCFICH resource of the subframe without using blind decoding.

The PHICH carries the positive-acknowledgement (ACK)/negative-acknowledgement(NACK) for hybrid automatic repeat request (HARQ). The ACK/NACK signal about the UL data on the PUSCH transmitted by the UE is transmitted on the PHICH.

The physical broadcast channel is transmitted in 4 OFDM symbols before the second slot of the first subframe of the wireless frame. The PBCH carries system information which is essential in communication between the UE and the base station, and the system information transmitted through the PBCH is called a master information block (MIB). Furthermore, the system information, which is indicated by the PDCCH and is transmitted on the PDSCH, is called a system information block (SIB).

The control information transmitted through the PDCCH is called downlink control information (DCI). The DCI may include resource allocation of PDSCH (also called DL grant), resource allocation of PUSCH (also called UL grant), and activation voice over Internet protocol (VoIP) and/or a set of transmission power control commands for individual UEs within an arbitrary UE group.

In the 3GPP LTE, blind decoding is used for detection of PDCCH. The blind decoding is a scheme of demasking the desired identifier to the cyclic redundancy check (CRC) of the received PDCCH (called a candidate PDCCH) and checking the CRC error and checking whether the PDCCH is its own control channel.

After determining the PDCCH format according to the DCI which is to be sent to the UE, the base station attaches the CRC on the DCI and masks the unique identifier (called the radio network temporary identifier (RNTI)) with the CRC according to the owner or usage of the PDCCH.

The control region within the subframe includes a plurality of control channel elements (CCE). The CCE is a logical allocation unit used to provide the encoding rate according to the state of the wireless channel to the PDCCH, and corresponds to a plurality of resource elements groups (REGs). The REG includes a plurality of resource elements. The format of the PDCCH and the number of bits of possible PDCCH are determined according to the correlation between the number of CCEs and the encoding rate provided by the CCEs.

One REG includes 4 REs, and one CCE includes 9 REGs. In order to form one PDCCH, $\{1, 2, 4, 8\}$ CCEs, and each element of $\{1, 2, 4, 8\}$ is called CCE aggregation level.

The number of CCEs used in transmission of the PDDCH is determined by the base station according to the channel state. For example, one CCE may be used in PDCCH transmission in the UE having a good downlink channel state. 8 CCEs may be used in the PDCCH transmission in the UE having a poor downlink channel state.

The control channel, which is composed of one or more CCEs, performs interleaving in REG units, and is mapped with the physical resource after the cyclic shift based on the cell ID is performed.

Figure 3:
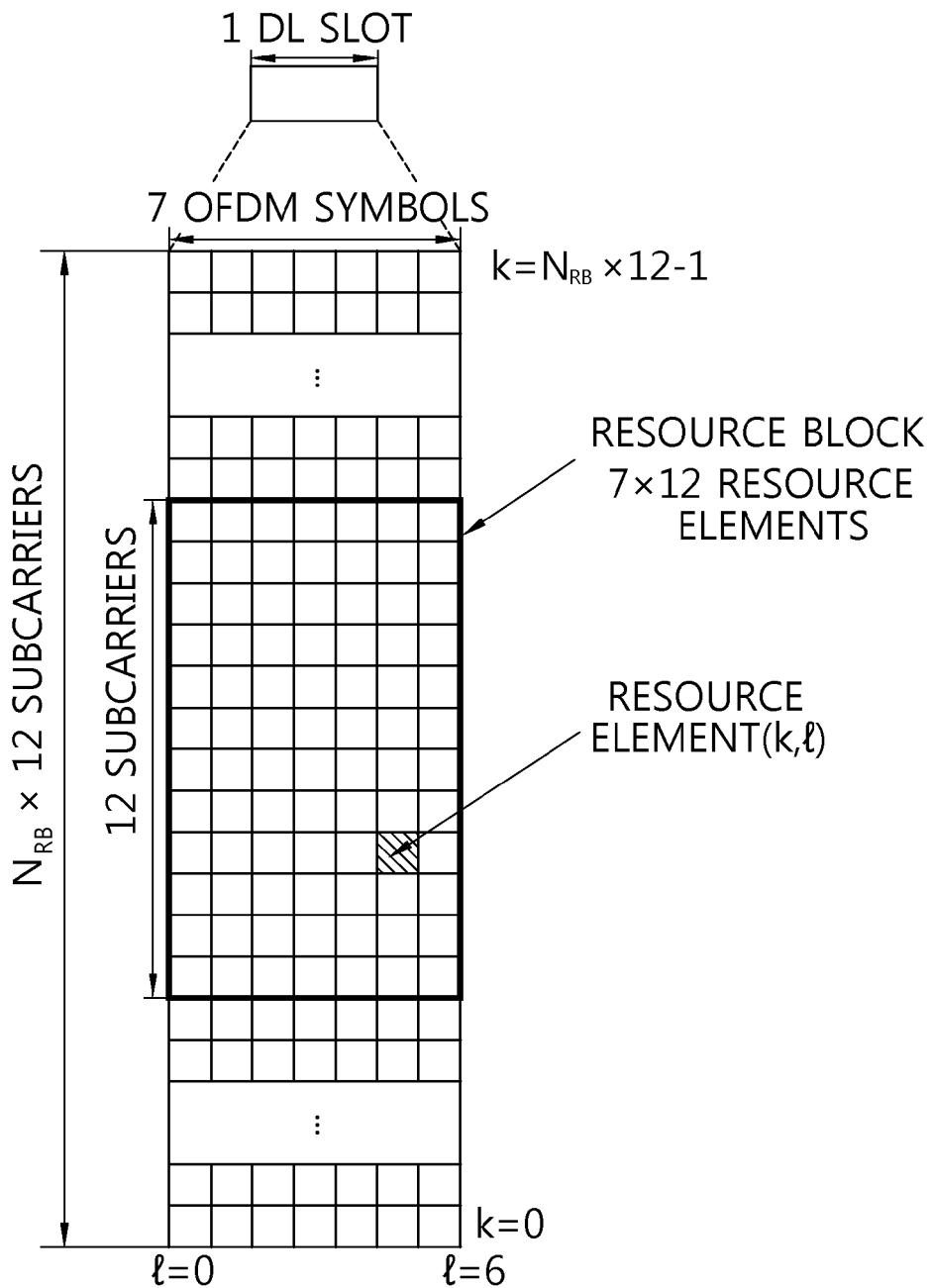
FIG. 3 shows an example of a resource grid for one downlink slot.

FIG. 3 shows an example of a resource grid for one downlink slot.

The downlink slot includes a plurality of OFDM symbols in the time domain, and includes $N_{RB}$ resource blocks in the frequency domain. $N_{RB}$, which is the number of resource blocks included in the downlink slot, is dependent on the downlink transmission bandwidth which is set in the cell. For example, in the LTE system, the $N_{RB}$ may be one of 6 to 110. One resource block includes a plurality of subcarriers in the frequency domain. The structure of the uplink slot may be the same as the structure of the downlink slot.

Each element on the resource grid is called a resource element (RE). The resource element on the resource grid may be identified by the index pair (k, l) within the slot.

Here, k ($k=0, \ldots, N_{RB} \times 12-1$) is the subcarrier index within the frequency domain, and l ($l=0, \ldots, 6$) is the OFDM symbol index within the time domain.

Here, it is illustrated that one resource block includes 7 OFDM symbols in the time domain and includes 7×12 resource elements composed of 12 subcarriers in the frequency domain, but the number of OFDM symbols and subcarriers in the resource block is not limited thereto. The number of OFDM symbols and the number of subcarriers may be changed depending on the length of the CP and the frequency spacing, etc. For example, in the case of the normal CP, the number of OFDM symbols is 7, and in the case of the extended CP, the number of OFDM symbols is 6. In one OFDM symbol, the one of 128, 256, 512, 1024, 1536 and 2048 may be selected and used as the number of subcarriers.

Various reference signals (RSs) may be transmitted to a sub-frame. For example, all UEs may receive a cell-specific reference signal (CRS) in a cell, and the CRS is transmitted through the whole downlink band. The CRS may be generated based on a cell ID. Further, the UE-specific Reference Signal (URS) may be transmitted to the sub-frame. The CRS is transmitted to the whole region of the sub-frame in a frequency side. The URS is transmitted to only a PDSCH region corresponding to the frequency side and is transmitted into a data region of the sub-frame in a time side. The URS is called demodulation RS (DM-RS).

For antenna port 5, the URS sequence rns(m) is defined as the following equation.

$$r_{n_s}(m) = \frac{1}{\sqrt{2}}(1 - 2 \cdot c(2m)) + j\frac{1}{\sqrt{2}}(1 - 2 \cdot c(2m+1)), \quad \text{Equation 1}$$

$$m = 0, 1, \ldots, 12N_{RB}^{PDSCH} - 1$$

In equation 1, $N^{PDSCH}_{RB}$ indicates the frequency band of the corresponding PDSCH transmission in resource block units.

The pseudo-random sequence is defined by the gold sequence of the following length 31.

$$c(n) = (x_1(n + Nc) + x_2(n + Nc)) \bmod 2 \quad \text{Equation 2}$$

$$x_1(n + 31) = (x_1(n + 3) + x_1(n)) \bmod 2$$

$$x_2(n + 31) = (x_2(n + 3) + x_2(n + 2) + x_2(n + 1) + x_2(n)) \bmod 2$$

The pseudo-random sequence is initialized to $c_{init}=(\lfloor n_s/2 \rfloor+1) \cdot (2N_{ID}^{cell}+1) \cdot 2^{16}+n_{RNTI}$ in the start of each subframe. Here, nRNTI denotes the radio network temporary identifier.

Furthermore, when the antenna port p is $\{7, 8, \ldots, v+6\}$, the URS sequence r(m) may be defined as follows.

$$r(m) = \frac{1}{\sqrt{2}}(1 - 2 \cdot c(2m)) + j\frac{1}{\sqrt{2}}(1 - 2 \cdot c(2m+1)), \quad \text{Equation 3}$$

$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}$$

The pseudo-random sequence is initialized to $c_{init}=(\lfloor n_s/2 \rfloor+1) \cdot 2N_{ID}^{cell}+1) \cdot 2^{16}+n_{SCID}$ in the start of each subframe.

The $n_{SCID}$ is given in the most recent DCI format 2B or 2C associated with the PDSCH transmission according to the following table.

TABLE 1

| Scrambling identity field in DCI format 2B or 2C | $n_{SCID}$ |
|---|---|
| 0 | 0 |
| 1 | 1 |

If there is no DCI format 2B or 2C associated with the PDSCH transmission of antenna port 7 or 8, the UE assumes that $n_{SCID}$ is 0. The UE assumes that $n_{SCID}$ is 0 for antenna ports 9 to 14.

The URS supports the PDSCH transmission, and is transmitted in antenna port p=5, p=7, p=8 or p=7, 8, . . . , v+6. Here, "v" denotes the number of layers used in transmission.

The URSs may be transmitted one UE through antenna ports included in set S. S={7, 8, 11, 13}, or S={9, 10, 12, 14}.

For antenna port p=7, p=8, p=7, 8, . . . , v+6, the physical resource block having frequency domain index $n_{PRB}$ is allocated for PDSCH transmission. Part of the URS sequence r(m) is mapped in the complex value demodulation symbol $a^{(p)}_{k,l}$ as follows.

$$a^{(p)}_{k,l} = w_p(l') \cdot r(3 \cdot l' \cdot N_{RB}^{max,DL} + 3 \cdot n_{PRB} + m') \quad \text{Equation 4}$$

where $$w_p(i) = \begin{cases} \overline{w}_p(i) & (m' + n_{PRB}) \bmod 2 = 0 \\ \overline{w}_p(3-i) & (m' + n_{PRB}) \bmod 2 = 1 \end{cases}$$

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l' \bmod 2 + 2 & \text{if in a special subframe with configuration 3, 4, or 8(see Table 4.2-1)} \\ l' \bmod 2 + 2 + 3\lfloor l'/2 \rfloor & \text{if in a special subframe with configuration 1, 2, 6, or 7(see table 4.2-1)} \\ l' \bmod 2 + 5 & \text{if not in a special subframe} \end{cases}$$

$$l' = \begin{cases} 0, 1, 2, 3 & \text{if } n_s \bmod 2 = 0 \text{ and in a special subframe with configuration 1, 2, 6, or 7(see table 4.2-1)} \\ 0, 1 & \text{if } n_s \bmod 2 = 0 \text{ and not in a special subframe with configuration 1, 2, 6, or 7(see table 4.2-1)} \\ 2, 3 & \text{if } n_s \bmod 2 = 1 \text{ and not in a special subframe with configuration 1, 2, 6, or 7(see table 4.2-1)} \end{cases}$$

$$m' = 0, 1, 2$$

Sequence $\overline{w}_p(i)$ is given in the normal CP as the following table.

TABLE 2

| (Antenna port p) | $[\overline{w}_p(0)\ \overline{w}_p(1)\ \overline{w}_p(2)\ \overline{w}_p(3)]$ |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

That is, the constitution of the URS is determined by the cell ID($N^{cell}_{ID}$), scrambling ID($n_{SCID}$), the antenna port(p), etc.

Figure 4:
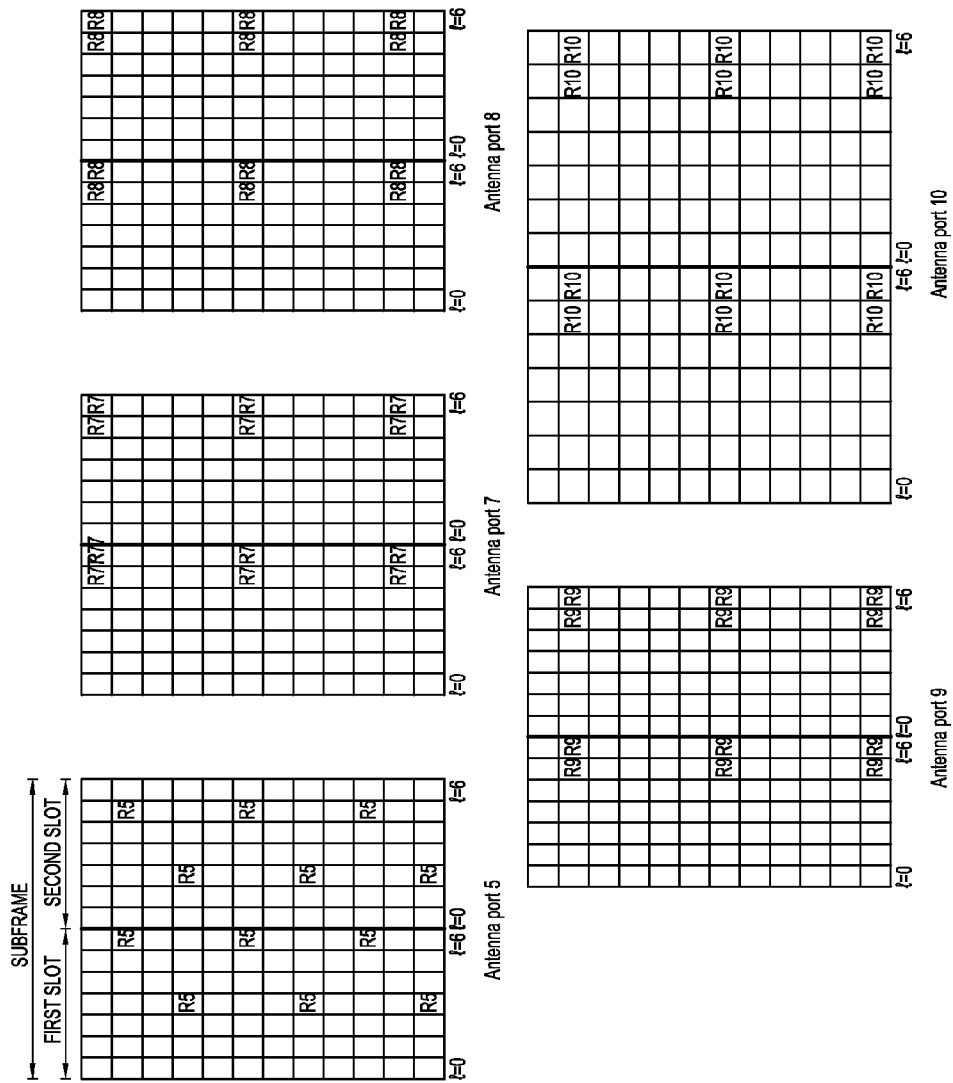
FIG. 4 shows an example of RB to which URS is mapped and shows DM-RS as an example of the URS.

FIG. 4 shows an example of RB to which URS is mapped and shows DM-RS as an example of the URS.

FIG. 4 shows resource elements used for DM-RS in the normal CP structure. Rp denotes a resource element used in DM-RS transmission on antenna port P. For example, R5 indicates a resource element transmitted by DM-RS for antenna port 5. Furthermore, referring to FIG. 4, DM-RS for antenna ports 7 and 8 is transmitted through resource elements corresponding to first, sixth and eleventh subcarriers (subcarrier indexes 0, 5, and 10) of sixth and seventh OFDM symbols (OFDM symbol indexes 5 and 6) of each slot. The DM-RS for antenna ports 7 and 8 may be distinguished by the orthogonal sequence of length 2. The DM-RS for antenna ports 9 and 10 is transmitted through resource elements corresponding to second, seventh and twelfth subcarriers (subcarrier indexes 1, 6, and 11) of sixth and seventh OFDM symbols (OFDM symbol indexes 5 and 6) of each slot. The DM-RS for antenna ports 9 and 10 may be distinguished by the orthogonal sequence of length 2. Furthermore, S={7, 8, 11, 13} or S={9, 10, 12, 14}, and thus DM-RS for antenna ports 11 and 13 is mapped to the resource element where DM-RS for antenna ports 7 and 8 is mapped, and the DM-RS for antenna ports 12 and 14 is mapped to the resource element where the DM-RS for antenna ports 9 and 10 is mapped.

Furthermore, in 3GPP Rel-11 or higher system, the multi-node system including a plurality of connection nodes for performance improvement like FIG. 1 is introduced. Furthermore, the standardization work for applying various MIMO schemes and cooperative communication schemes which are under development and can be applied in the future is under progress.

Due to the node introduction, an introduction of a new control channel for applying various cooperative communication schemes to a multi-node environment is being requested. The control channel, about which a new introduction is being discussed, is enhanced-PDCCH (E-PDCCH).

Figure 5:
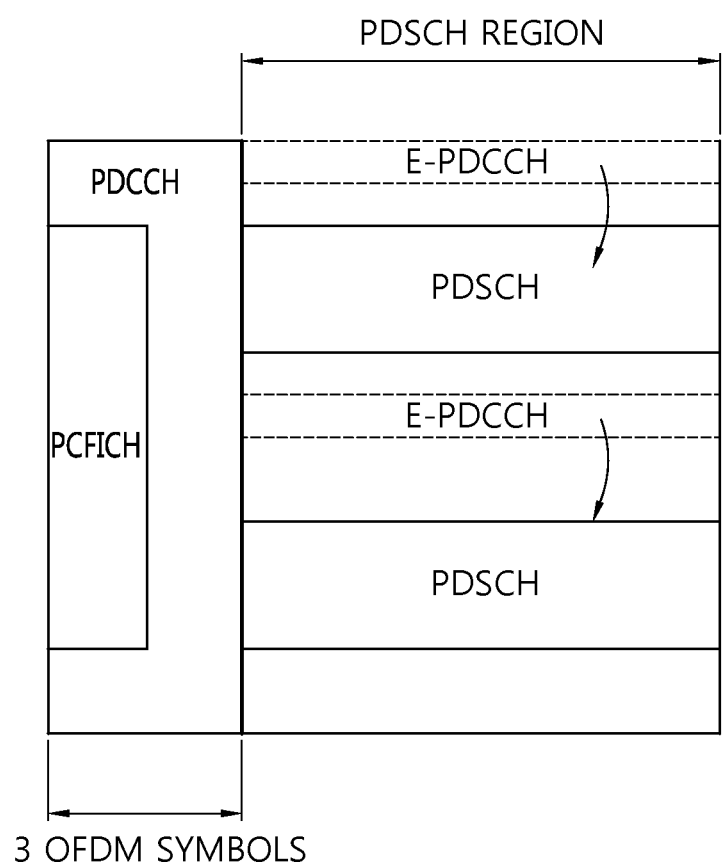
FIG. 5 shows an example of E-PDCCH.

FIG. 5 shows an example of E-PDCCH.

The allocation location of the E-PDCCH may be within the data region (PDSCH region) other than the existing control region (PDCCH region). The control information for the node may be transmitted for each UE through the E-PDCCH, and thus the lacking problem of the existing PDCCH region may be resolved.

The E-PDCCH is not provided to UEs which are operated by the existing 3GPP rel 8-10, and may be searched by the UE which operates in Rel 11 or higher version. Further, part of the PDSCH region is allocated so as to be used. For example, the E-PDCCH may define part of the PDSCH which generally transmits data as in FIG. 6 so as to be used. The UE may perform blind decoding in order to detect the UE's own E-PDCCH. The E-PDCCH may perform the same scheduling operation as that of the existing PDCCH, i.e., the PDSCH or PUSCH scheduling operation.

The structure of the existing R-PDCCH structure may be reused in a specific allocation scheme of the E-PDCCH. This is to minimize the impact which occurs when the already standardized standard is changed.

Figure 6:
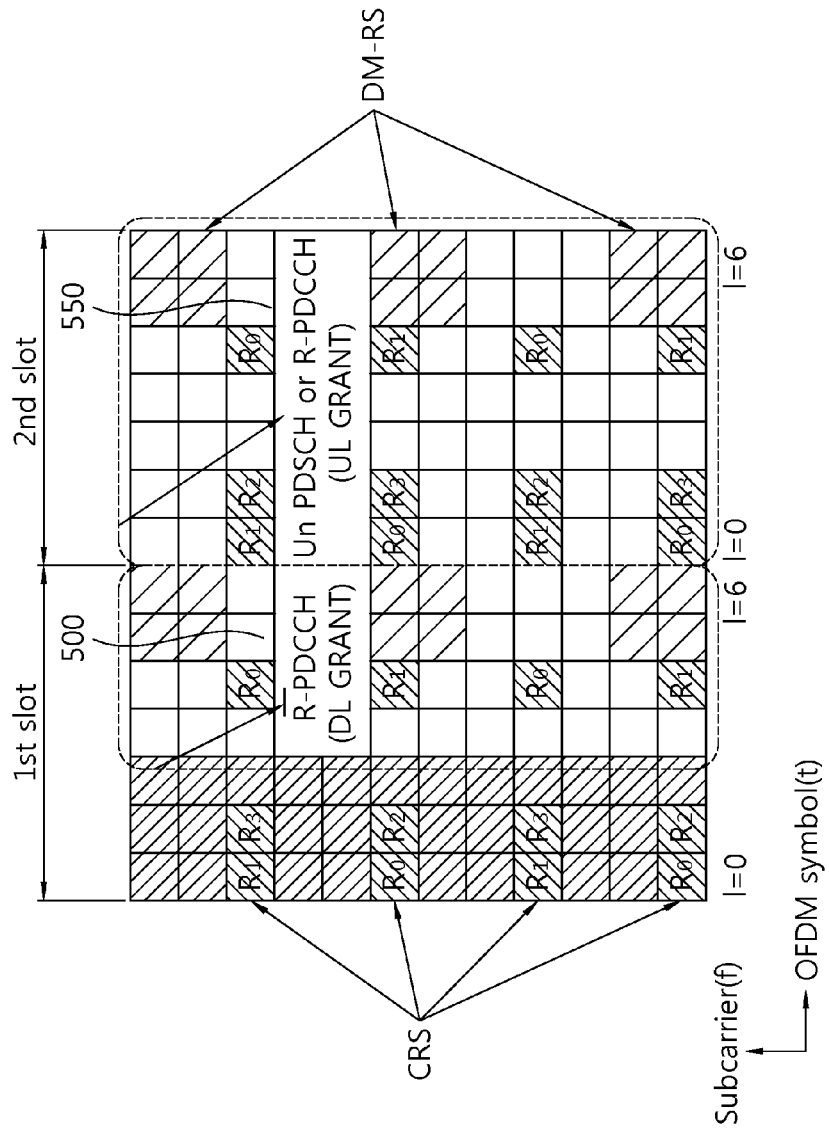
FIG. 6 shows an example of an existing R-PDCCH.

FIG. 6 shows an example of the existing R-PDCCH.

In the frequency division duplex (FDD) system, only the DL grant is allocated in the first slot of the resource block, and the UL grant or data (PDSCH) may be allocated in the second slot. At this time, R-PDCCH is allocated to the data RE except all of the PDCCH, CRS, and URS. All of URS and CRS may be used in the R-PDCCH modulation as in Table 3.

When the URS is used, antenna port 7 and scrambling ID=0 is used. On the other hand, when using the CRS, antenna port 0 is used only when the number of the PBCH transmission antennas is 1, and all of antenna ports {0 to 1} and {0 to 3} may be used by converting to the transmission diversity mode when the number of PBCH transmission antennas is 2 or 4.

TABLE 3

| Transmission mode | DCI format | Transmission scheme of PDSCH corresponding to R-PDCCH |
|---|---|---|
| Mode 8 | DCI format 1A | When R-PDCCH is demodulated based on URS: Single antenna port: antenna port 7 and $n_{SCID}$ = 0 is used. When R-PDCCH is demodulated based on CRS: If the number of PBCH antenna ports is 1, a single antenna port, i.e., antenna port 0, is used. Otherwise, the transmission diversity is used. |
|  | DCI format 2B | Dual layer transmission by antenna ports 7 and 8; Or signal antenna port by antenna port 7 or 8 |
| Mode 9 | DCI format 1A | When R-PDCCH is demodulated based on URS: Single antenna port: antenna port 7 and $n_{SCID}$ = 0 is used. When R-PDCCH is demodulated based on CRS: If the number of PBCH antenna ports is 1, a single antenna port, i.e., antenna port 0, is used. Otherwise, the transmission diversity is used. |
|  | DCI format 2C | Up to 4 layer transmissions are used: antenna ports 7 to 10 |

<Operation method of E-PDCCH>

Figure 7:
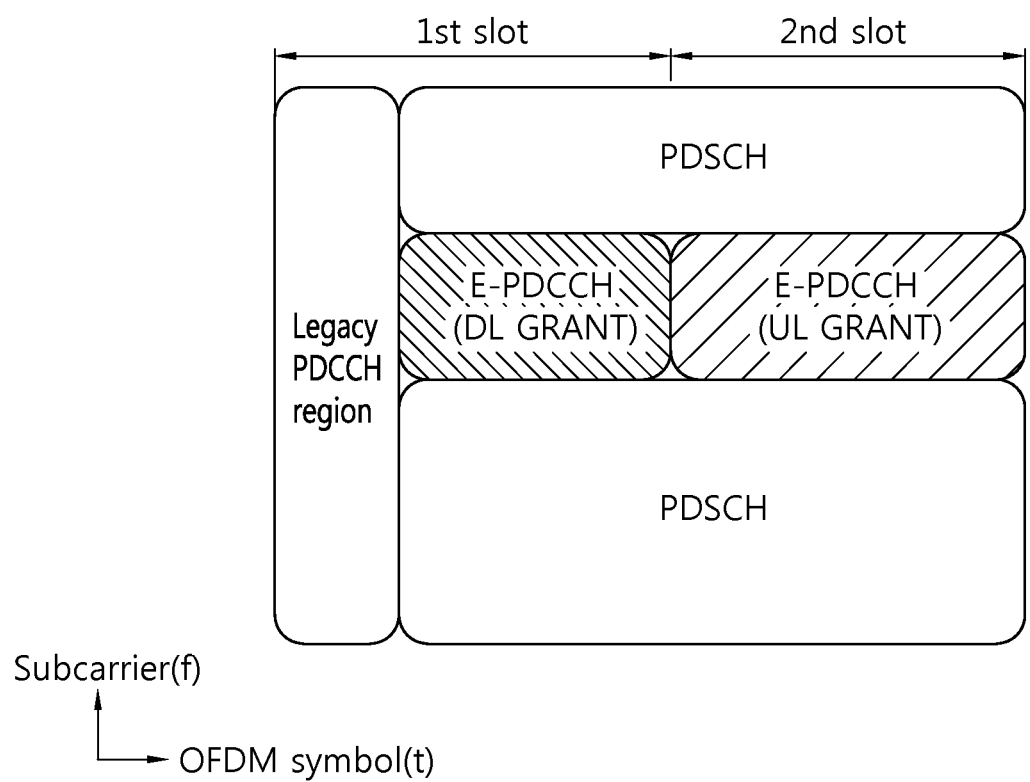
FIG. 7 shows an example of separating and allocating a DL grant and a UL grant for each slot.

FIG. 7 shows an example of separating and allocating a DL grant and a UL grant for each slot. The case where the E-PDCCH is formed at both the first slot and the second slot within the subframe is assumed.

Referring to FIG. 7, the DL grant is allocated to the first slot of the subframe, and the UL grant is allocated to the second slot.

The DL grant means DCI formats for transmitting downlink control information of the UE, for example, DCI formats 1, 1A, 1B, 1C, 1D, 2, and 2A. The UL grant means DCI formats including control information associated with the uplink transmission of the UE, for example, DCI formats 0 and 4.

The UE is divided into a DL grant and a UL grant which need to be searched for each slot within the subframe. Hence, blind decoding for finding the DL grant is performed by forming a search space within the first slot, and blind decoding for finding the UL grant is performed in the search space formed in the second slot.

In the LTE, there are modes 1 to 9 in the downlink transmission mode, and there are modes 1 to 2 in the uplink transmission mode. Each transmission is set for each UE through the upper layer signaling. In the downlink transmission mode, there are two DCI formats which need to be found by each UE for each set mode. On the other hand, in the uplink transmission mode, the number of DCI formats, which need to be found by each UE, is 1 or 2. For example, in the uplink transmission mode 1, the DCI format 0 corresponds to UL grant, and in the uplink transmission mode 2, the DCI formats 0 and 4 correspond to the UL grant.

In the case of FIG. 7, the number of times of blind decoding, which needs to be performed to detect the UE's E-PDCCH in the search space formed for each slot, is as follows.

DL grant: (number of PDCCH candidates)×(number of DCI formats for downlink transmission mode)=16×2=32.

UL grant: (number of PDCCH candidates in uplink transmission mode 1)×(number of DCI formats in uplink transmission mode 1)=16×1=16 or (number of PDCCH candidates in uplink transmission mode 2)×(number of DCI formats in uplink transmission mode 2)=16×2=32.

Hence, the total number of times of blind decoding, which is generated by combining the number of times of blind decoding in the first slot and the number of times of blind decoding in the second slot, is 32+16=48 in the uplink transmission mode 1, and 32+32=64 in the uplink transmission mode 2.

Figure 8:
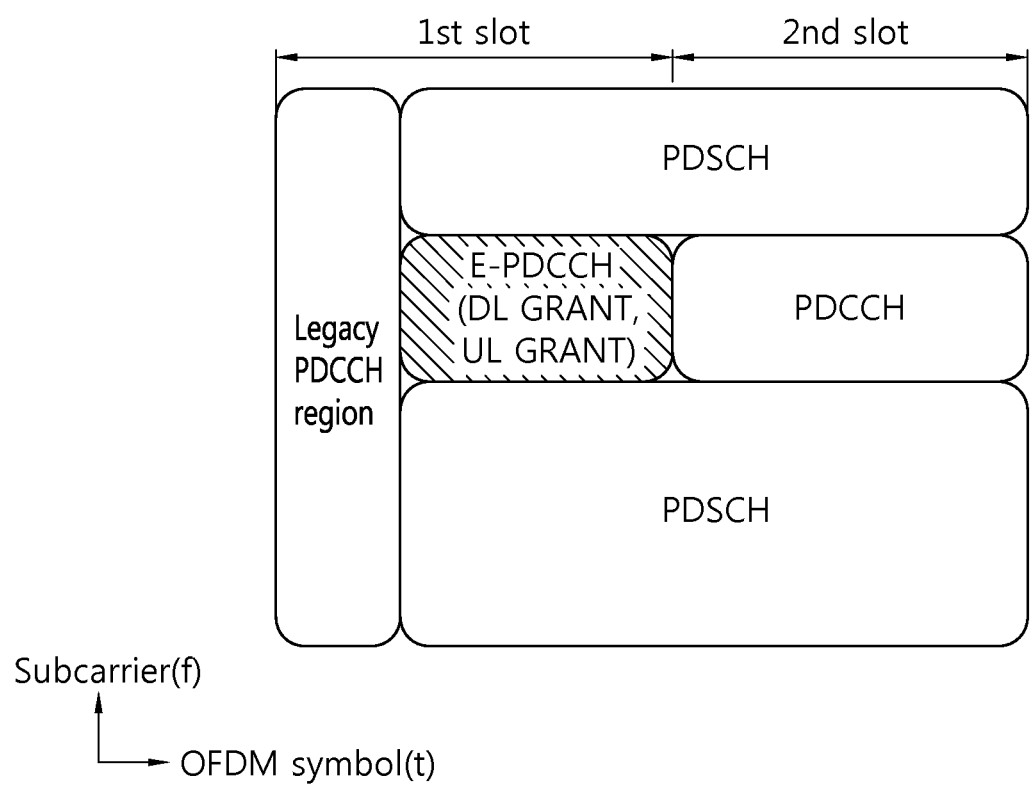
FIG. 8 shows an example of simultaneously allocating a DL grant and a UL grant for a first slot.

FIG. 8 shows an example of simultaneously allocating a DL grant and a UL grant for a first slot. The case where the E-PDCCH is formed only in the first slot of the subframe is assumed.

Referring to FIG. 8, when allocating the E-PDCCH, the DL grant and the UL grant may be simultaneously allocated to the first slot of the subframe. Hence, the DL grant and the UL grant simultaneously exist in the E-PDCCH of the first slot. The UE performs blind decoding for detecting the DL grant and the UL grant only in the first slot.

In the LTE, DCI formats, which need to detected, are determined according to the transmission mode which is set for each UE. In particular, a total of 2 DCI formats may be detected for each downlink transmission mode, and DCI format 1A is basically included in all downlink transmission modes in order to support the fall-back mode.

In the UL grant, the DCI format 0 has the same length as that of the DCI format 1A, and may be distinguished through a 1 bit flag. Hence, the additional blind decoding is not performed. However, DCI format 4, which is the remaining one among the UL grants, needs to perform the additional blind decoding.

In the case of FIG. 8, the number of times of blind decoding, which needs to be performed to search for the UE's E-PDCCH in the search space, is as follows.

DL grant: (number of PDCCH candidates)×(number of DCI formats for downlink transmission mode)=16×2=32.

UL grant: (number of PDCCH candidates in uplink transmission mode 1)×(number of DCI formats in uplink transmission mode 1)=0 or (number of PDCCH candidates in uplink transmission mode 2)×(number of DCI formats in uplink transmission mode 2)=16×1=16.

Hence, the total number of times of blind decoding is 32+0=32 in the uplink transmission mode 1, and 32+16=48 in the uplink transmission mode 2.

<Cross-Interleaving of E-PDCCH>

Similarly to R-PDCCH, the cross-interleaving (hereinafter, simply referred to as "interleaving") may also be applied in the E-PDCCH. In a state where a common PRB set which is common to a plurality of UEs is set, a plurality of UEs' E-PDCCH may be interleaved to the frequency domain or time domain.

Figure 9:
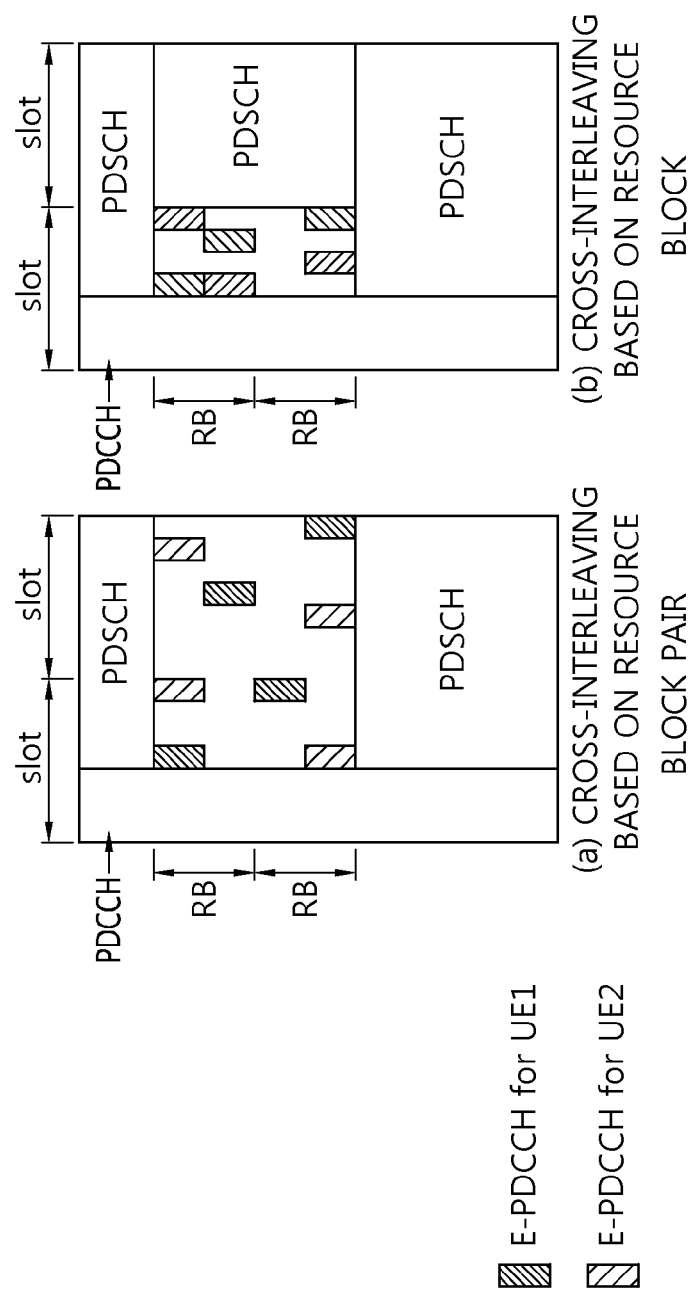
FIG. 9 shows an example of interleaving of E-PDCCH.

FIG. 9 shows examples of interleaving of E-PDCCH.

FIG. 9A shows an example of performance of cross-interleaving based on a resource block pair, and FIG. 9B shows an example of performance of cross-interleaving based on a resource block.

As illustrated in FIG. 9, a plurality of E-PDCCHs for a plurality of UEs may be distributed and allocated in the time domain and frequency domain. If such cross-interleaving is used, the frequency/time diversity may be obtained throughout the plurality of resource blocks, and thus the diversity gain may be obtained.

Unlike the CRS-based PDCCH, the URS-based PDCCH (i.e., the above-described E-PDCCH) may be decoded through the URS which is generated based on different antenna ports and sequences for each UE.

Furthermore, the E-PDCCH may be mapped to the wireless resource in a cross-interleaved form or may be mapped to the wireless resource in a form that is not cross-interleaved. The form, which is not cross-interleaved, is a form in which wireless resources are locally allocated, and the cross-interleaved form is a form in which the wireless resource is allocated in a distributed manner. Hereinafter, the region where the cross-interleaved E-PDCCH is allocated is called the interleaving region, and the region where the non-cross-interleaved E-PDCCH is allocated is called a non-interleaving region.

Each of the interleaving region and the non-interleaving region may be determined using the physical resource block (PRB), the virtual resource block (VRB), or slot as allocation units. The VRB is a resource block which has the same size as that of the PRB and is distinguished by the logical index. Furthermore, each of the interleaving region and the non-interleaving region may be determined using the partitioned resource blocks, which are generated by partitioning PRB and VRB, as allocation units. That is, a new allocation unit other than the existing resource block may be used.

In the non-interleaving region, the allocation unit may be used according to the aggregation level of the E-PDCCH. For example, if the allocation unit is the slot in the non-interleaving region, in the group level {1, 2, 4, 8} of E-PDCCH, the E-PDCCH may be composed of 1, 2, 4, or 8 slots.

Likewise, if the allocation unit is the division resource block which is generated by dividing the resource block into N parts, the group level of the E-PDCCH indicates the number of division resource blocks which may form the E-PDCCH. If the group level is {1, 2, 4, 8}, the E-PDCCH may be composed of 1, 2, 4, or 8 division resource blocks. For example, N may be 4. At this time, if the group level is greater than 4, one more resource block is used.

If the E-PDCCH is allocated using the division resource blocks, which are generated by dividing the resource block into N parts, as units, the group level may be a set other than {1, 2, 4, 8}. For example, when N is 4, the group level may be set to {1, 2, 4} or {1, 2, 3, 4}. Likewise, if the group level is redefined, all group levels may be provided in one resource block.

In the interleaving region, the smallest group level of the E-PDCCH may be formed of the minimum 2 resource blocks, slots, or division resource blocks.

The present invention will now be described.

As described above, unlike an existing PDCCH decoded based on a CRS, the E-PDCCH is decoded based on the URS (DM-RS). That is, the E-PDCCH is decoded based on different antenna ports by UEs, that is, an URS having a reference signal sequence.

Further, as described above, the E-PDCCH may be allocated to an interleaving region and a non-interleaving region.

A monitoring unit of the E-PDCCH may be determined in the interleaving region according to an aggregation level. For example, if the E-PDCCH is allocated in slot units, and the aggregation level is {1, 2, 4, 8}, 1, 2, 4, or 8 slots are monitored.

If a division resource block obtained by dividing a resource block by N is used as an allocation unit of the E-PDCCH, the aggregation level indicates how many units are monitored by the division resource blocks. For example, when N=4, if the aggregation level is {1, 2, 4, 8}, the UE monitors a division resource block obtained by dividing the resource block in 1, 2, 4, or 8 units. In this case, the division resource block may be configured by two resource blocks.

The aggregation level is configured by existing {1, 2, 4, 8}. However, in the present invention, an aggregation level such as {1, 2, 3, 4} different from an existing aggregation level may be used. If an allocation unit of the E-PDCCH is a division resource block obtained by dividing a resource block by 4 and the aggregation level is {1, 2, 3, 4}, all monitoring according to each aggregation level may be performed in one resource block.

In the interleaving region, the smallest aggregation level of the E-PDCCH may represent a plurality of resource blocks, slots, or division resource block unit.

Figure 10:
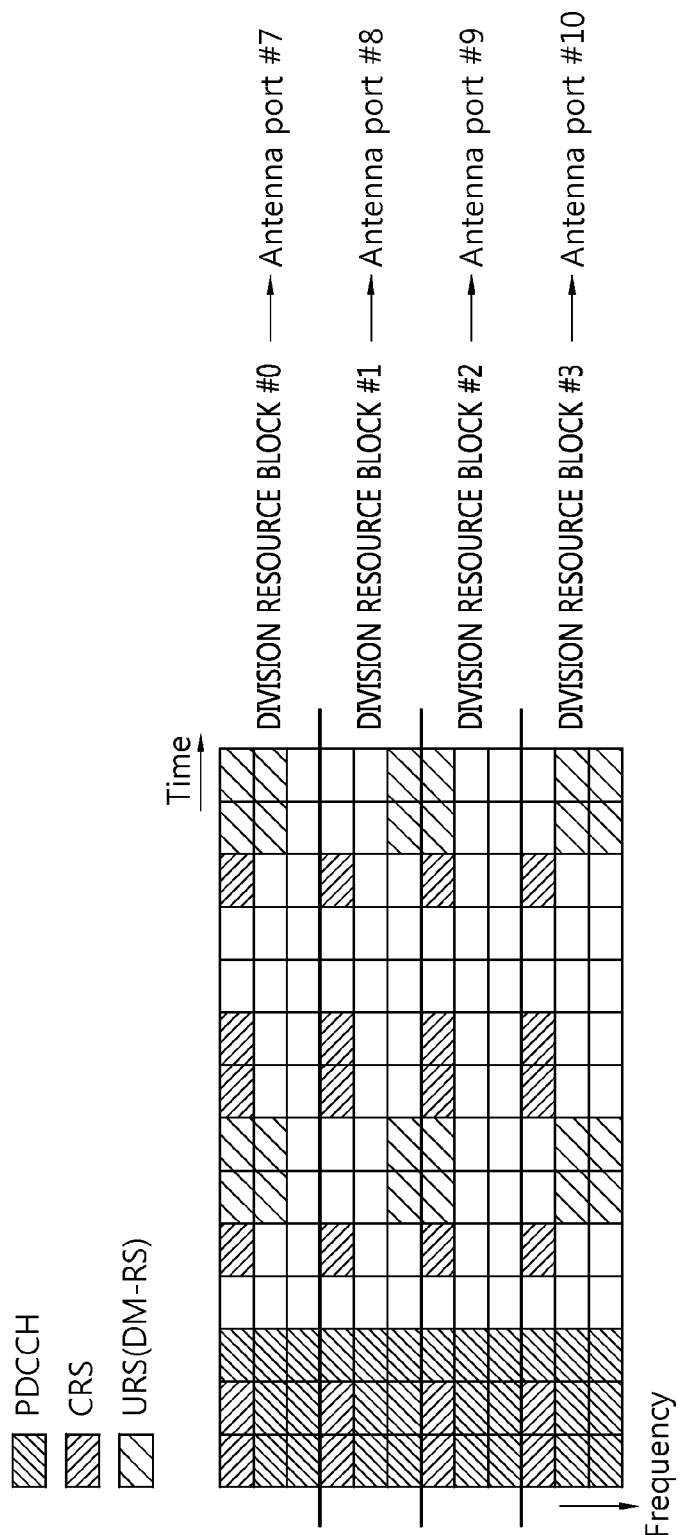
FIG. 10 shows an example of URS allocation in allocation units of an E-PDCCH.

FIG. 10 illustrates an example of URS allocation in allocation units of an E-PDCCH.

Referring to FIG. 10, each resource block in a resource block pair configured by two resource blocks may be divided into four division resource blocks such as division resource blocks #0, 1, 2, 3 in a frequency domain. Each division resource block may be an allocation unit of an E-PDCCH.

In this case, it may be defined that an URS with respect to a specific antenna port is allocated to each division resource block. For example, it may be defined that an URS with respect to an antenna port #7 is allocated to a division resource block #0, an URS with respect to an antenna port #8 is allocated to a division resource block #1, an URS with respect to an antenna port #9 is allocated to a division resource block #2, and an URS with respect to an antenna port #10 is allocated to a division resource block #3.

In this manner, if an antenna port of the URS allocated to each division resource block is previously defined, the number of times of E-PDCCH blind decoding of the UE may be reduced. For example, when the UE sequentially performs blind decoding for division resource blocks #0~3, if the antenna port is not defined for each division resource block, blind decoding using the URS with respect to four antenna ports should be performed for every division resource block. In contrast, when the antenna port is defined for each division resource block, blind decoding is performed using an URS with respect to one antenna port in a corresponding division resource block. Accordingly, the number of blind decoding of the UE is reduced.

However, according to a scheme of previously defining an antenna port of the URS in allocation units of the E-PDCCH, when an aggregation level of the E-PDCCH is 1, the number of blind decoding can be reduced. However, when the aggregation level of the E-PDCCH is 2, the antenna port is unnecessarily consumed so that a channel estimation performance is deteriorated.

For example, it is assumed that the UE monitors the E-PDCCH in division resource blocks #0, 1, 2, 3 when an aggregation level of the E-PDCCH is 1, the UE monitors the E-PDCCH in division resource blocks {#0, #1}, {#2, #3} when an aggregation level of the E-PDCCH is 2, and the UE monitors the E-PDCCH in division resource blocks {#0, #1, #2, #3} when an aggregation level of the E-PDCCH is 4. In this case, when the aggregation level is 2, the UE estimates a channel in division resource blocks {#0, #1} using an URS by antenna ports 7 and 8. An E-PDCCH in division resource blocks {#0, #1} should be decoded using the above result. When all URSs with respect to antenna ports 7 and 8 are used, transmission power of each URS is divided into two parts so that the channel estimation performance with respect to each antenna port is degraded.

As one method of solving the above problem, the UE estimates a channel with respect to an antenna port 7 using an URS with respect to the antenna port 7, estimates a channel with respect to an antenna port 8 using an URS with respect to the antenna port 8, and again processes each channel estimation result to estimate channels with respect to the antenna ports 7 and 8. However, such a method may unnecessarily increase the cost to implement the UE.

Hereinafter, a method of monitoring the E-PDCCH of the UE will be described in a system where an antenna port is defined in allocation units (for example, division resource block) to which the E-PDCCH is allocated.

Figure 11:
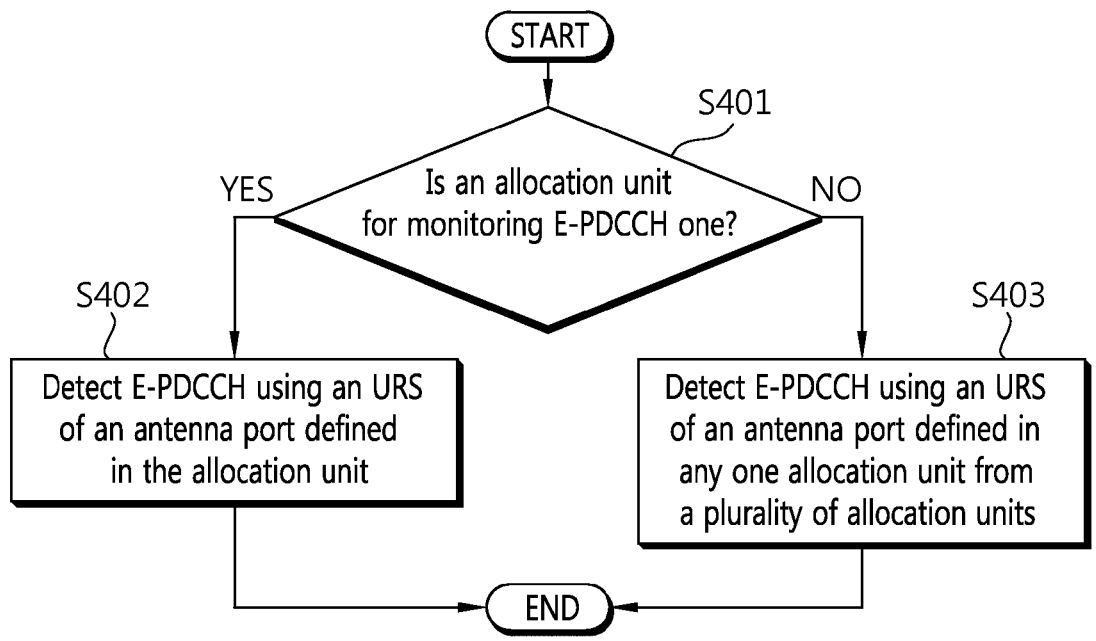
FIG. 11 shows a method of monitoring a control channel according to an embodiment of the present invention.

FIG. 11 illustrates a method of monitoring a control channel according to an embodiment of the present invention.

Referring to FIG. 11, the UE determines whether an allocation unit for monitoring the E-PDCCH is one or plural in number (S401). If the allocation unit for monitoring the E-PDCCH is one, that is, if the aggregation level is 1, the UE detects the E-PDCCH using an URS of an antenna port defined in a corresponding allocation unit (S402).

In contrast, if the allocation unit for monitoring the E-PDCCH is plural, that is, if the aggregation level is at least two, the UE detects the E-PDCCH using an URS of an antenna port defined in any one allocation unit from a plurality of allocation units (S403). In this case, the UE may designate whether to detect the E-PDCCH using an URS of a certain antenna port previously or through signaling. The signaling may be achieved through an upper layer signal or a physical layer signal.

That is, as a modified example of the embodiment, when the allocation unit for monitoring the E-PDCCH is one, the UE detects the E-PDCCH using an URS of one antenna port indicated by the upper layer signal or the physical layer signal. Further, when the allocation unit for monitoring the E-PDCCH is plural in number, the UE may detect the E-PDCCH using an URS of one antenna port indicated by the upper layer signal or the physical layer signal.

When the allocation unit for monitoring the E-PDCCH is plural and each allocation unit is indexed, the UE may detect the E-PDCCH using an URS of an antenna port defined in an allocation unit having the smallest index. In an example of FIG. 10, when the aggregation level is 2 and monitoring division resource blocks #0, 1, the UE detects the E-PDCCH using an URS of an antenna port defined in an allocation resource block #0 having the smallest index, that is, an antenna port 7.

Alternatively, when the allocation unit for monitoring the E-PDCCH is plural in number and URSs of each antenna port are set to each allocation unit, the UE may detect the E-PDCCH using an URS of an antenna port having the smallest index. In an example of FIG. 10, when the aggregation level is 2 and monitoring division resource blocks #0, 1, the UE detects the E-PDCCH using an URS of an antenna port having the smallest index, that is, an antenna port 7.

A following table 4 lists examples of an URS where the UR uses to detect the E-PDCCH according to an allocation unit of the E-PDCCH.

TABLE 4

| Resource allocation unit to detect E-PDCCH | First embodiment: URS on antenna port number | Second embodiment: URS on antenna port number | Third embodiment: URS on antenna port number | Fourth embodiment: URS on antenna port number |
| --- | --- | --- | --- | --- |
| #0 | #7 | #7 | #7 | #7 |
| #1 | #8 | #8 | #7 | #7 |
| #2 | #9 | #11 | #8 | #7 |
| #3 | #10 | #13 | #8 | #7 |
| #0, #1 | #7 | #7 | #7 | #7 |
| #2, #3 | #9 | #11 | #8 | #7 |
| #0, #1, #2, #3 | #7 | #7 | #7 | #7 |

In the first embodiment of table 4, URSs of antenna ports #7, 8 are sequentially allocated to resource allocation units #0, 1, and URSs of antenna ports #9, 10 are allocated to resource allocation units #2, 3, respectively. That is, URSs using resource elements different from URSs of antenna ports #7, 8 are allocated to resource allocation units #2, 3, respectively. The E-PDCCH is not transmitted from resource elements which URSs may use in a resource block.

Unlike the first embodiment, the second embodiment sequentially allocates URSs of antenna ports #11, 13 to resource allocation units #2, 3, respectively. As described above, since antenna ports #7, 8, 11, 13 use the same resource elements, the number of resource elements usable by the E-PDCCH is increased as compared with the first embodiment.

A third embodiment illustrates a usable method when the number of transmission antennas is 2 and a fourth embodiment illustrates a usable method when the number of a transmission antenna is 1.

Hereinafter, a method of configuring an allocation unit of the E-PDCCH between neighbor cells or nodes will be described.

If a specific node transmits each E-PDCCH from the same resource block as that of a neighbor node (or cell), the specific node and the neighbor node cause interference with respect to the E-PDCCH therebetween. In order to reduce the interference with respect to the E-PDCCH, the present invention suggests a method of interfering only some RE from an allocation unit (for example, division resource block of a resource block) of the E-PDCCH with each other.

Figure 12:
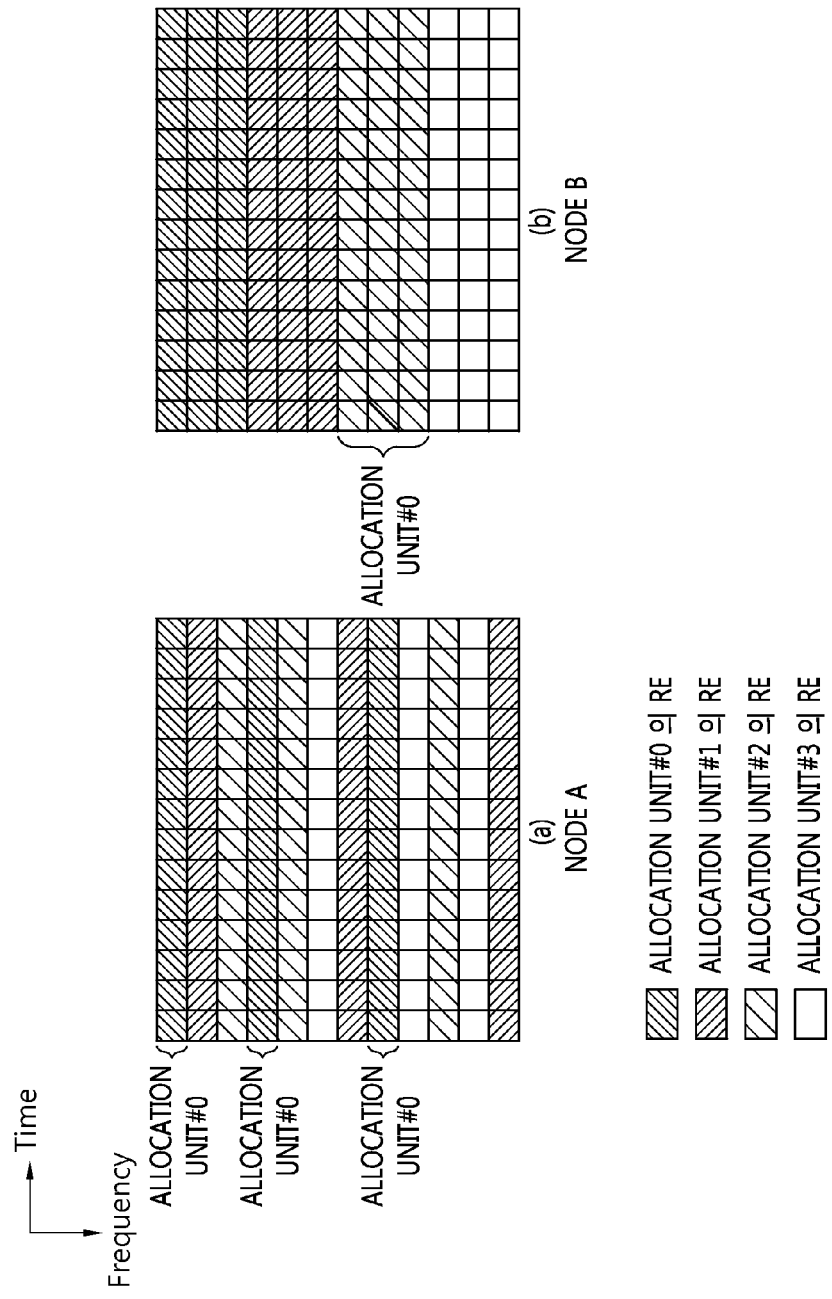
FIG. 12 shows an example of configuring resource elements (REs) serving an allocation unit of the E-PDCCH in neighbor nodes A and B.

FIG. 12 illustrates an example of configuring resource elements (REs) serving an allocation unit of the E-PDCCH in neighbor nodes A and B.

Referring to FIG. 12, in a node A, resource elements of an allocation unit of the E-PDCCH are distributed in a frequency domain. Meanwhile, in a node B, resource elements of an allocation unit of the E-PDCCH are distributed in a frequency domain. Accordingly, although the E-PDCCH is transmitted using the same allocation unit (for example, allocation unit #0), interference between the resource elements is reduced. For example, the nodes A and B overlap with each other by one resource element in a frequency domain with respect to an allocation unit #0. If the nodes A and B allocate resource elements serving as an allocation unit of the E-PDCCH in the same manner, all resource elements to which the E-PDCCH may overlap with each other in some cases.

A method of FIG. 12 is generalized. In each node, resource elements configuring an allocation unit of the E-PDCCH may be expressed to be independently set by at least one of a resource block number, a slot number, a sub-frame number, a frame number, an antenna port number, a cell ID, and a parameter used to generate the URS. By the above method, resource elements configuring an allocation unit of the E-PDCCH in each node may be randomized and interference of each node with the E-PDCCH of a neighbor node may be reduced.

Figure 13:
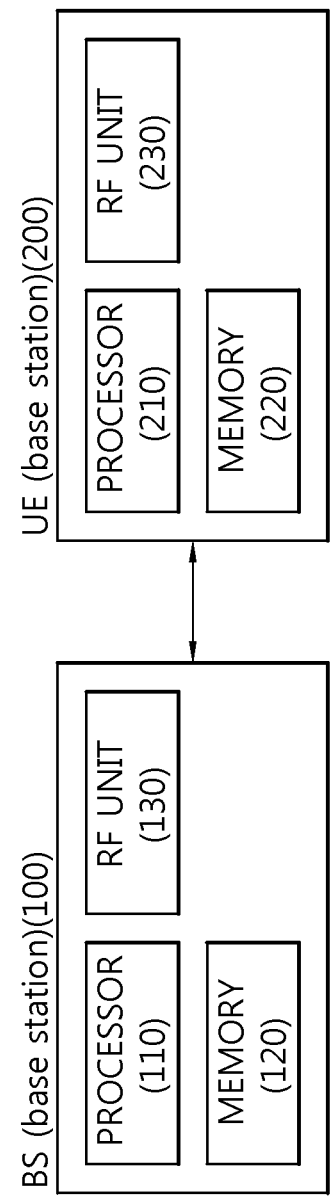
FIG. 13 is a block diagram illustrating a wireless apparatus according to embodiment of the present invention.

FIG. 13 is a block diagram showing a wireless device to which an embodiment of the present invention may be applied.

The base station 100 includes a processor 110, a memory 120, and a radio frequency unit (RF unit) 130. The processor 111 implements the suggested function, process, and/or method. The layers of the wireless interface protocol may be implemented by the processor 110. The memory 120 is connected to the processor 110 and stores various information sets for operating the processor 110. The RF unit 130 is connected to the processor and receives transmits and/or receives wireless signals.

The UE 200 includes a processor 210, a memory 220, and an RF unit 230. The processor 210 implements the suggested function, process, and/or method. The layers of the wireless interface protocol may be implemented by the processor 210. The memory 220 is connected to the processor and stores various information sets for operating the processor 210. The RF unit is connected to the processor 210 and transmits and/or receives wireless signals.

The processor 110 or 210 may include an application-specific integrated circuit (ASIC) and other chipsets, logic circuit and/or data processing device. The memory 120 or 220 may include a read-only memory (ROM), a random access memory (RAM), a flash memory, a memory card, a storage medium, and/or another storage device. The RF unit 130 or 230 may include a baseband circuit for processing wireless signals. When the embodiment is implemented as software, the above-described scheme may be implemented as a module (process, function, etc.) which forms the above-described function. The module may be stored in the memory 120 or 220 and may be executed by the processor 110 or 210. The memory 120 or 220 may exist inside or outside the processor 110 or 210, and may be connected to the processor 110 or 210 in various well-known means.

What is claimed is:

1. A method for detecting a control channel in a wireless communication system, the method performed by a user equipment (UE) and comprising:
    determining whether an allocation unit constituting an enhanced-physical downlink control channel (E-PDCCH) is one or plural in number; and
    if the allocation unit constituting the E-PDCCH is plural in number, detecting the E-PDCCH using a UE specific reference signal (URS) of an antenna port defined in one allocation unit from the plurality of allocation units in a subframe comprising a first slot and a second slot,
    wherein, if the E-PDCCH is located at both the first slot and the second slot, the UE performs a blind decoding for finding a downlink grant only in the first slot and performs a blind decoding for finding an uplink grant only in the second slot, and
    wherein, if the E-PDCCH comprises a plurality of allocation units and the plurality of allocation units are indexed, the URS comprises a URS of an antenna port defined in an allocation unit having a smallest index among the plurality of allocation units.

2. The method of claim 1, wherein a preset URS of an antenna port is transmitted to the allocation unit constituting the E-PDCCH.

3. The method of claim 1, wherein the allocation unit constituting the E-PDCCH comprises a division resource block obtained by dividing a resource block (RB), and the RB comprises 7 or 6 orthogonal frequency division multiplexing (OFDM) symbols in a time domain and 12 subcarriers in a frequency domain.

4. The method of claim 1, further comprising:
    if the E-PDCCH comprises only one allocation unit, detecting the E-PDCCH using an URS of an antenna port defined in the one allocation unit.

5. The method of claim 1, wherein the allocation unit constituting the E-PDCCH is configured by different resource elements in a plurality of nodes included in the wireless communication system.

6. User equipment (UE) for detecting a control channel in a wireless communication system, the UE comprising:
    a radio frequency (RF) unit to transmit and receive a wireless signal; and
    a processor connected to the RF unit,
    wherein the processor determines whether an allocation unit constituting an enhanced-physical downlink control channel (E-PDCCH) is one or plural in number; and if the allocation unit constituting the E-PDCCH is plural in number, the processor detects the E-PDCCH using a UE specific reference signal (URS) of an antenna port defined in one allocation unit from the plurality of allocation units in a subframe comprising a first slot and a second slot,
    wherein if the E-PDCCH is located at both the first slot and the second slot, the processor performs a blind decoding for finding a downlink grant only in the first slot and performs a blind decoding for finding an uplink grant only in the second slot, and
    wherein, if the E-PDCCH comprises a plurality of allocation units and the plurality of allocation units are indexed, the URS comprises a URS of an antenna port defined in an allocation unit having a smallest index among the plurality of allocation units.

7. The UE of claim 6, wherein a preset URS of an antenna port is transmitted to the allocation unit constituting the E-PDCCH.

8. The UE of claim 6, wherein, if the E-PDCCH comprises only one allocation unit, the processor detects the E-PDCCH using an URS of an antenna port defined in the one allocation unit.

* * * * *